March 17, 1970 — O. KORNGOLD — 3,500,812
BARBEQUE STOVE
Filed April 19, 1968
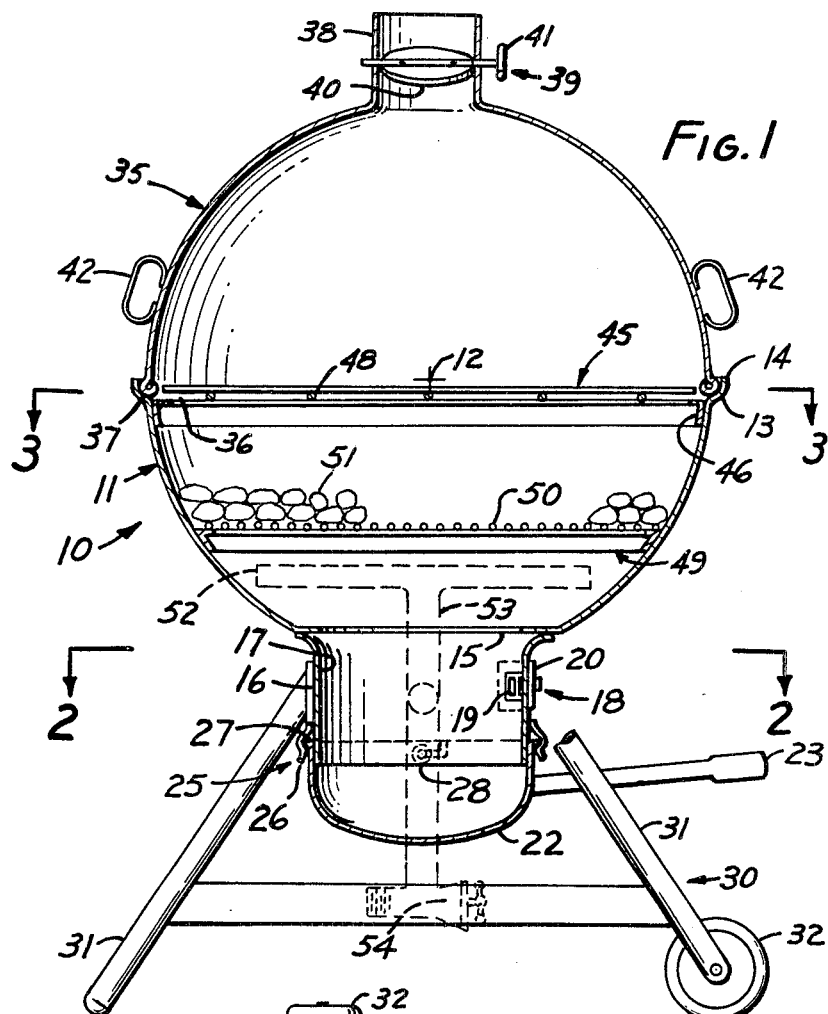
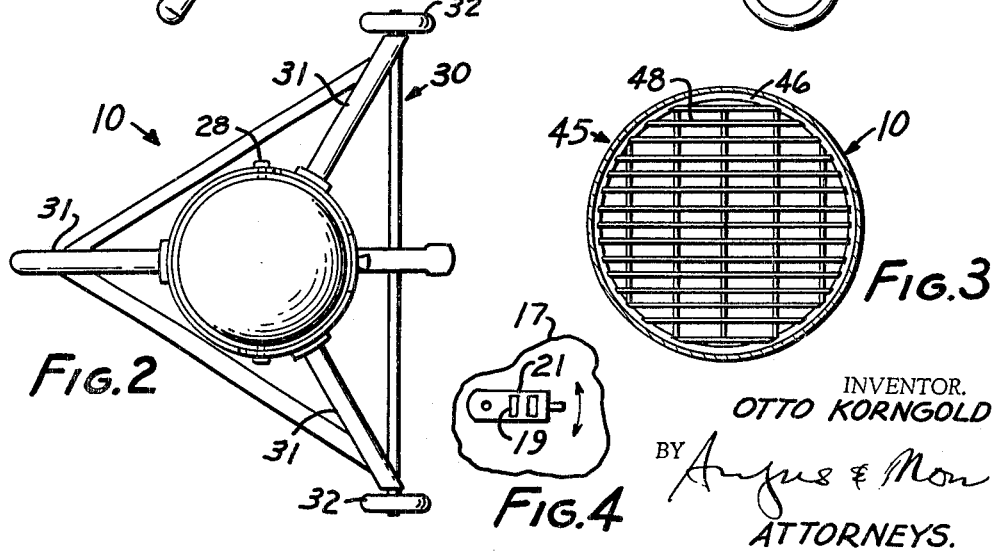
INVENTOR.
OTTO KORNGOLD
BY Angus & Mon
ATTORNEYS.

United States Patent Office 3,500,812
Patented Mar. 17, 1970

3,500,812
BARBEQUE STOVE
Otto Korngold, 61 E. Arthur, Arcadia, Calif. 91006
Filed Apr. 19, 1968, Ser. No. 722,763
Int. Cl. F24b 3/00; A47j 37/07
U.S. Cl. 126—25                                    12 Claims

ABSTRACT OF THE DISCLOSURE

This disclosure relates to a covered barbeque stove. The stove includes a base shell and a cover shell which are separably joined together at an upwardly facing flange formed on the base shell so that the cover shell fits inside the flange, and drippings drip into the base shell instead of onto the outside of the structure. The cover shell includes a flue on its central axis with exhaust gas control means in it, and the base shell includes a port to which an ash pan is removably fitted to catch ashes therein. Air inlet control means is provided in the base shell.

Food support means and fuel supply means are also provided inside the base shell.

---

This invention relates to a covered barbeque stove having a new and novel configuration, and also means for keeping it clean during use and adapting it for easier cleaning.

The stove of this invention includes a base shell and a cover shell which are preferably generally spherical zones of equal radius. The base shell includes an outwardly and upwardly extending flange inside which the open end of the cover shell fits. The drippings from the cover shell go into the base shell instead of on the outside of the structure. The cover shell includes a flue and a damper means in it to control exhaust gas flow, and a port is provided in the bottom of the base shell to which an ash pan is removably attached so that the ashes can readily be cleaned out. Air inlet control means is provided in the base shell.

According to preferred features of the invention, fuel supply means is provided inside the base shell, optionally in the form of a grating for supporting charcoal or in the form of a gas burner, disposed beneath food supply means in the form of a perforated grating.

The other feature of this invention will be fully understood from the following detailed description and the accompanying drawings, in which:

FIG. 1 is an axial cross-section of the presently preferred embodiment of the invention;

FIG. 2 is a cross-section taken at line 2—2 of FIG. 1;

FIG. 3 is a partial cross-section taken at line 3—3 of FIG. 1; and

FIG. 4 is a side fragmentary elevation of an optional form of air-inlet control means for the stove of FIG. 1.

A covered barbeque stove 10 according to the invention is shown in FIG. 1. It includes a base shell 11 which has a continuous wall that is generally the zone of a sphere, which sphere has a center 12. An upwardly facing, outwardly extending flange 13 around the open upper end 14 of the base shell provides a shelf for means yet to be described. A port 15 is formed on the central axis of the base shell at the bottom thereof and a conduit 16 attached thereto as an extension of the base shell extends downwardly therefrom. In a wall 17 thereof, there is formed air inlet control means 18. These means may conveniently either comprise openings 19 with a slide plate 20 as shown in FIG. 1, or optionally may comprise the same openings 19 with a pivoted plate 21 as shown in FIG. 4. The plates cover an adjustable area of the openings to regulate air inflow.

An ash pan 22 having a handle 23 is removably attached to the bottom of conduit 16. Retention means 25 is formed between the ash pan and the said conduit (that is, to the base shell), which may comprise either clips 26 on the conduit which snap over a rim 27 on the ash pan, or a bayonet joint 28 comprising a pin and an angulated slot as illustrated in FIG. 1. Both forms of retention means are illustrated. They may both be used or either may optionally be used.

Wheel structure 30 comprising tripod legs 31 and wheels 32 is attached to conduit 24. It supports the stove off the ground for wheeled movement.

A cover shell 35 includes an open bottom end 36 with peripheral edge 37 which fits inside flange 13 and rests on the shelf so that drippings will flow into the base shell rather than onto the outside of the stove. At its upper end and on its central axis there is formed a flue 38 which is a tubular extension of the spherical surface, and within it is placed an exhaust gas control means 39, in this case a pivoted damper plate 40 with a handle 41. The flue may be a separate part that is attached to cover shell, or may be formed integrally therewith.

Grips 42 may be formed on the cover shell so that the cover shell may readily be lifted off.

Food support means 45 is provided in the base shell and conveniently comprises a peripheral bracket 46 attached to the inside of the shell with a conventional perforated grating 48 supported by it. Below this is a fuel supply means 49, the preferred embodiment being a grating 50 adapted to support a bed of charcoal 51. Optionally, a gas burner 52 may be supported inside the base shell by a gas pipe 53 that is connected to a valve 54. The details of the plumbing, and the location where the pipe passes through the shell are immaterial to the invention. Suffice it to say that it will bypass the ash pan in order that the ash pan may readily be recovered.

Because of the scale used in the drawings, it is not possible to illustrate the coating applied to the stove. It is well known that because of general sootiness and greasiness of products customarily cooked in barbeque stoves, it is difficult to clean them up, and often they become unsightly. This device is coated, inside and out, on all shell, flue, conduit and ash pan surfaces, with Teflon on the order of about one thousandth of an inch thick. This Teflon is resistant to heat of the order of magnitude used in such a stove and is readily wiped clean, because there is little tendency for anything to stick to it. Its use enables the shells to be made of aluminum which can readily either be cast, drawn, or spun to the desired shape, because it is scratch resistant, and the surface will not become cloudy as it would if uncoated aluminum surfaces were frequently wiped with grit. The spherical shape is itself a considerable advantage and economy, both in attractiveness and ease of formation of the structure, giving the greatest interval volume for least external surface and materials of construction used.

The device is readily controllable as to air flow, may be used with or without the cover shell, and may be used as a smoker-cooker if desired, by appropriate manipulations of the exhaust gas control means and of the fuel which is utilized.

The device is attractive, readily manufactured at comparatively low cost, and inherently long-lived.

This invention is not to be limited by the embodiments shown in the drawings and described in the description, which are given by way of illustration and not of limitation, but only in accordance with the scope of the appended claims.

What is claimed:

1. A covered barbeque stove comprising first support means; a base shell mounted to and supported by said first support means, said base shell having an open peripheral top; an integral, upwardly facing, outwardly extending flange forming a shelf around the upper edge of the base shell; a cover shell with an open end; a peripheral edge around said end being so shaped and proportioned as to rest upon and fit within said shelf whereby drippings from the cover shell drip into the base shell; a central flue at the top of the cover shell; exhaust control means in said flue; a central bottom port in said base shell; an ash pan adapted to fit to said base shell at said port and catch ashes therefrom; retention means for removably joining the ash pan to the base shell at said port; air inlet means extending through the wall of the base shell; second support means inside said base shell for supporting food to be cooked; and fuel-supply means beneath said second support means.

2. A covered barbeque stove according to claim 1 in which the flue is an upwardly extending pipe, and in which the gas-exhaust control means is a damper.

3. A covered barbeque stove according to claim 1 in which the retention means comprises a bayonet joint.

4. A covered barbeque stove according to claim 1 in which the retention means comprises a clip.

5. A covered barbeque stove according to claim 1 in which the inside and outside surfaces of the shells are coated with a heat resistant material capable of being readily wiped clean.

6. A covered barbeque stove according to claim 1 in which the base shell includes a downwardly-extending conduit in which the port is formed, the air-inlet means being provided in the wall of the conduit.

7. A covered barbeque stove according to claim 6 in which the flue is an upwardly extending pipe, and in which the gas-exhaust control means is a damper.

8. A covered barbeque stove according to claim 7 in which the inside and outside surfaces of the shells are coated with a heat resistant material capable of being readily wiped clean.

9. A covered barbeque stove according to claim 7 in which the first support means is a wheeled structure.

10. A covered barbeque stove according to claim 9 in which the second support means comprises a perforated grill and the fuel supply means comprises a grate for charcoal.

11. A covered barbeque stove according to claim 9 in which the second support means comprises a perforated grill and the fuel supply means comprises a gas burner.

12. A covered barbeque stove according to claim 5 in which both shells are substantially zones of spheres of equal radius.

References Cited

UNITED STATES PATENTS

| | | | |
|---|---|---|---|
| 133,231 | 11/1872 | Laparie et al. | 126—25 |
| 2,120,683 | 6/1938 | Simmons | 126—25 |
| 2,608,190 | 8/1952 | Winning et al. | 126—25 |
| 2,641,243 | 6/1953 | Goss | 126—25 |
| 3,241,545 | 3/1966 | Reinert et al. | 126—390 X |
| 3,298,361 | 1/1967 | Clark | 126—25 |
| 3,330,266 | 7/1967 | Stephen | 126—25 |

CHARLES J. MYHRE, Primary Examiner